Figure 5:
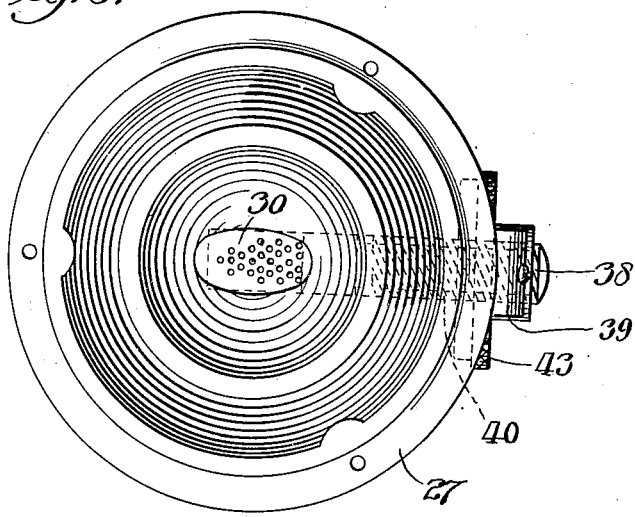

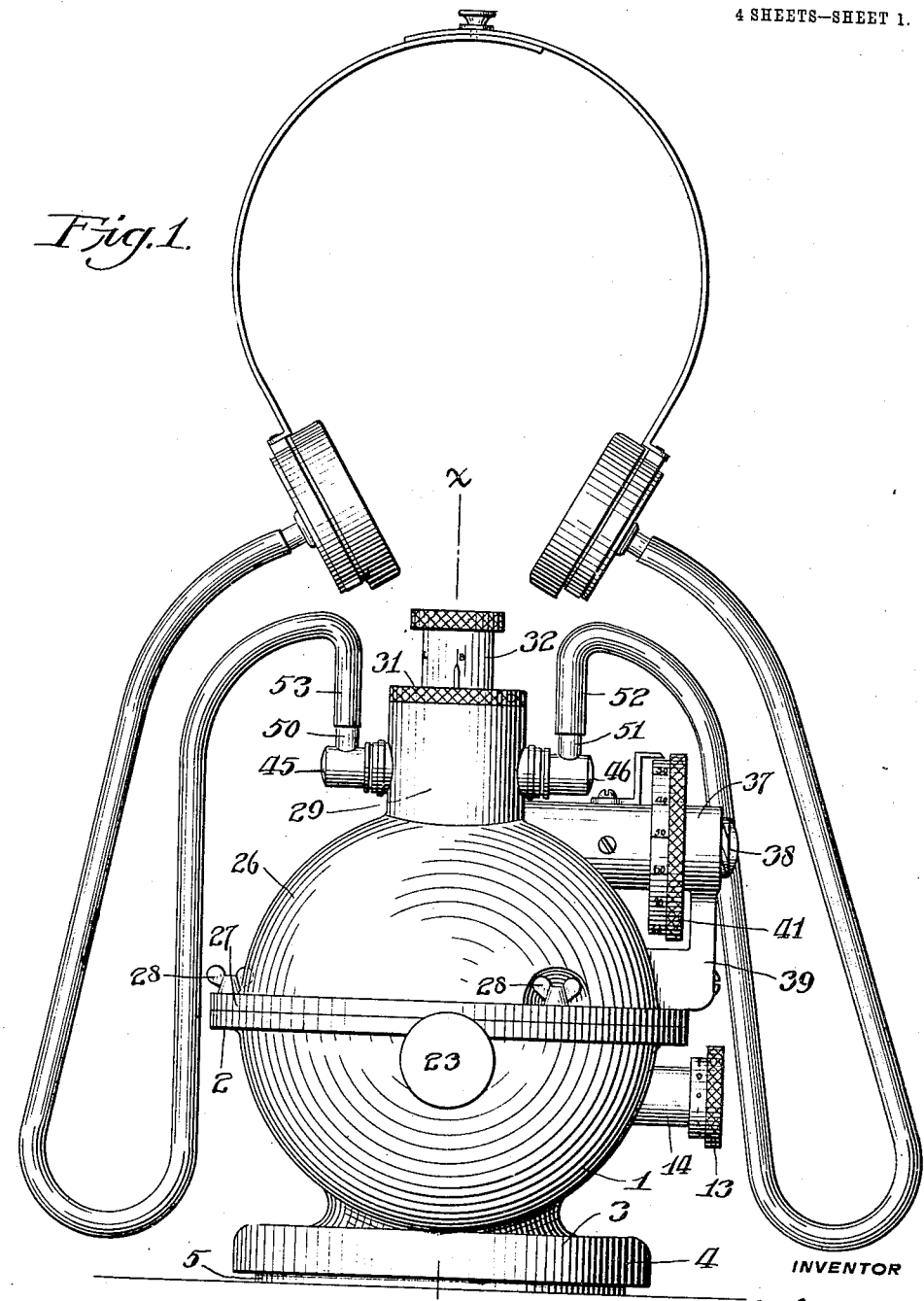

C. J. PILLING.
ACOUMETER.
APPLICATION FILED SEPT. 20, 1910.
1,017,795.
Patented Feb. 20, 1912.
4 SHEETS—SHEET 2.
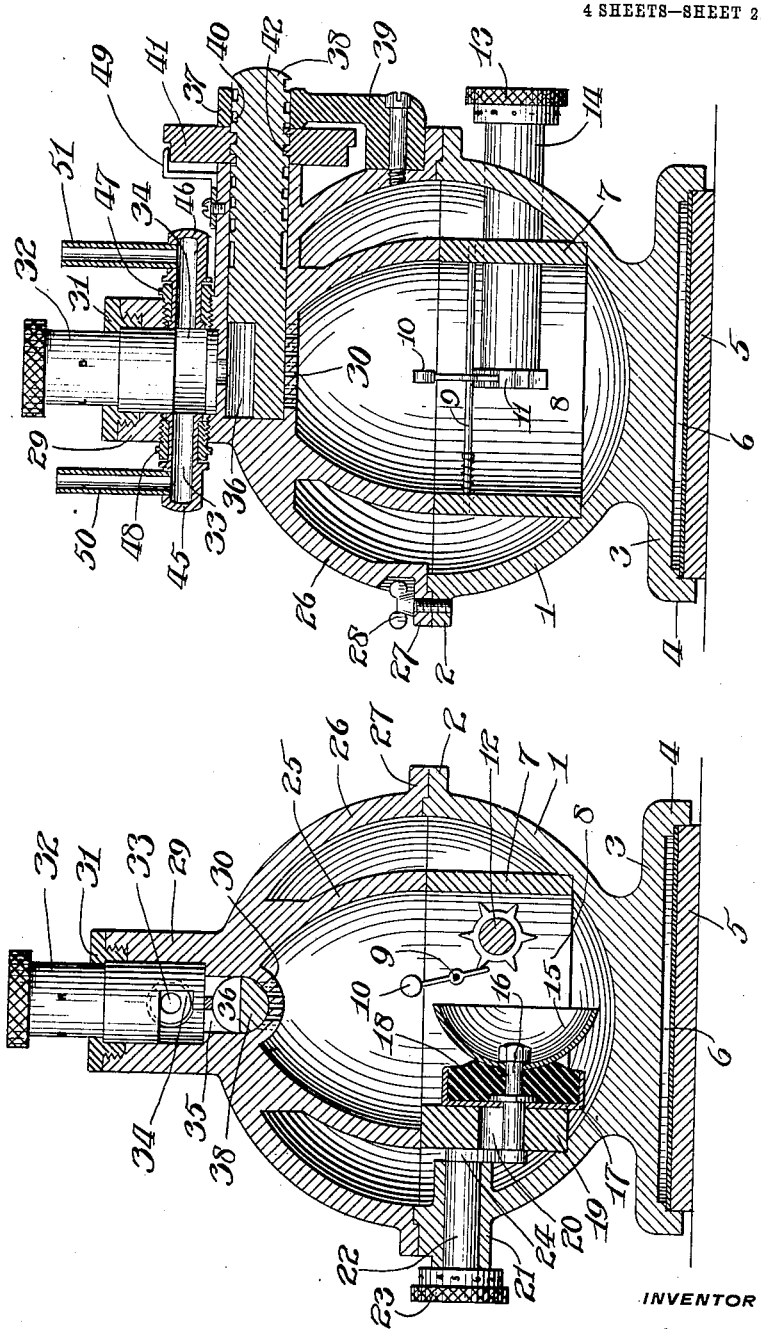

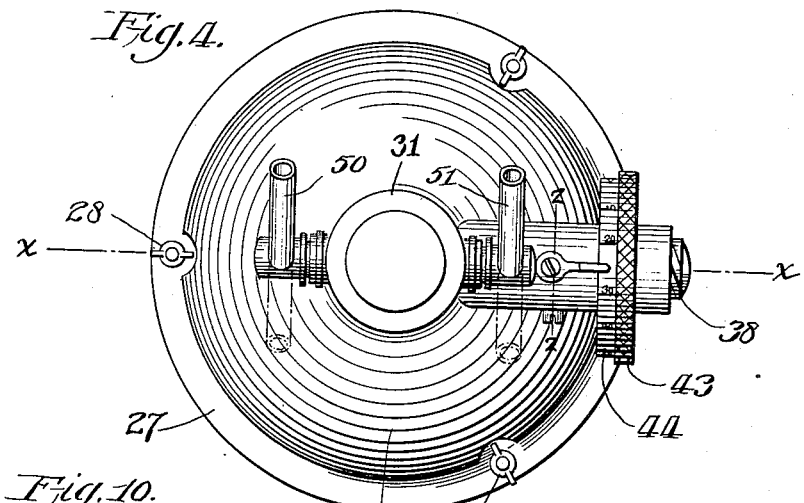
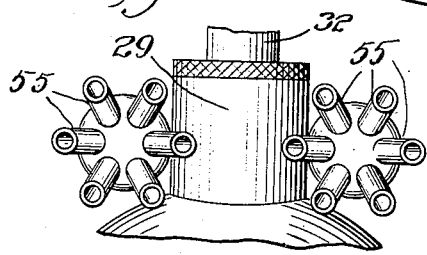
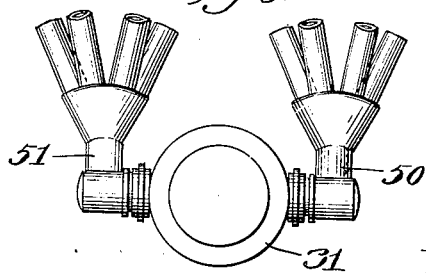
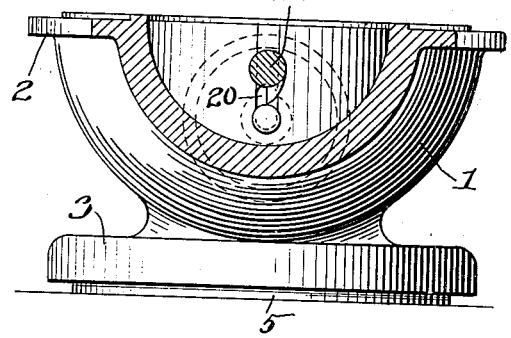
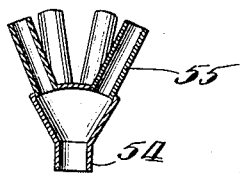

C. J. PILLING.
ACOUMETER.
APPLICATION FILED SEPT. 20, 1910.

1,017,795.

Patented Feb. 20, 1912.
4 SHEETS—SHEET 4.

WITNESSES

INVENTOR
Charles J. Pilling
BY
H. J. Heuton
ATTORNEY

UNITED STATES PATENT OFFICE.

CHARLES J. PILLING, OF PHILADELPHIA, PENNSYLVANIA.

ACOUMETER.

1,017,795.

Specification of Letters Patent. Patented Feb. 20, 1912.

Application filed September 20, 1910. Serial No. 582,817.

*To all whom it may concern:*

Be it known that I, CHARLES J. PILLING, a citizen of the United States, residing in the city of Philadelphia, State of Pennsylvania, have invented certain new and useful Improvements in Acoumeters, of which the following is a full, clear, and exact description, reference being had to the accompanying drawings, forming a part of this specification.

My invention relates to acoumeters, an instrument used in diagnostic determinations of defects in human hearing, and my invention has for its objects to extend the field of use of such instruments not only in determining the acuteness of hearing in an individual relatively to a predetermined standard, but of a plurality of individuals at the same time; also of one ear and not the other, of an individual; also as between individuals tested; and in addition to so extending its field of usefulness, to simplify the instrument and to render it more perfect in operation and accurate in its results produced.

To these ends my invention consists of an instrument of the class recited, comprising elements in structural combination and adapted to be brought into co-acting functional relation, as required, to produce the several results stated; these elements including a containing casing, preferably spherical internally and also in external outline and constructed in two semi-spherical flanged sections and detachably united through their flanges; a smaller casing therein also in two separate sections and forming between it and the outer casing an annular space constituting a sound-deadening or insulating chamber, said inner casing being preferably of rounded internal and external outlines and hence of curvilinear form or without corners or abrupt surfaces; sonorous means within the inner casing adapted to produce sound vibrations therein; actuating devices extending therefrom through the walls of the inner and outer casing and adapted, by manual application, to positively actuate said sound-producing means; an adjusting device within the inner casing, with means to actuate it from outside the outer casing, to vary the degree of loudness or pitch of the sound vibrations so produced; means forming a part of the outer casing and communicating with the inner casing and operating as the sole passage-way therefrom for said sound-vibrations to the exterior of the outer casing; oppositely-disposed and independently rotatable tubular means leading from said sound-discharge passage, valvular devices governing said passage-way and adapted to divert said sound vibrations to either, both or neither of said rotatable tubular means, for the testing of the right ear, or left ear, or both; detachable tubular means whereby both of said rotatable tubular sound-discharge means or either of them may be subdivided into a plurality of sound-discharge openings to adapt the instrument to the testing of two or more individuals at the same time, comparatively, and for either the right or the left ear or both; and finally, means such as a flexible binaural tubular device, of any such character, to operatively connect said tubular sound-discharge means or its branches with the outer ear or ears of the person to be tested.

Figure 6:
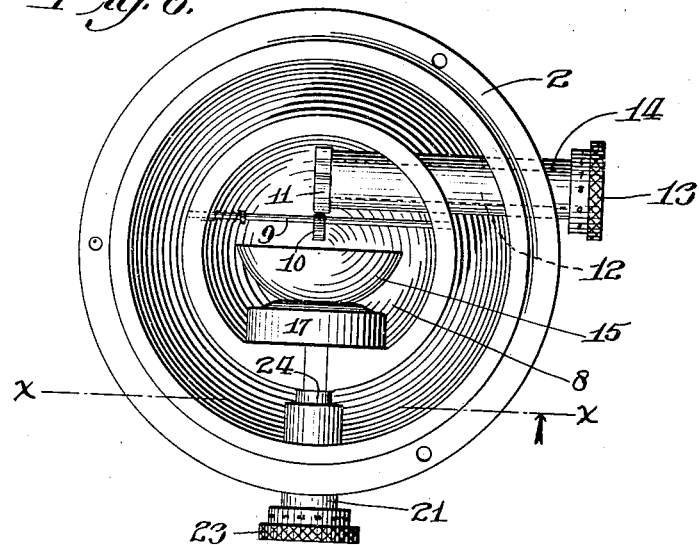

In the accompanying drawings illustrating my invention, Figure 1 is a front elevation of the apparatus, with a binaural sound-conveying device attached to the right and left sound-discharge passages of the instrument. Fig. 2 is a central vertical section on the line $x$ $x$ of Fig. 1. Fig. 3 is a central vertical section of same, on a line at right angles to the line on which Fig. 2 is taken, and also on line $x$ $x$ of Fig. 4, and Fig. 4 is a plan view of the device as shown in Fig. 3. Fig. 5 is a plan view, looking upward, of the upper section of the separate inner and outer casings. Fig. 6 is a plan view, looking downward, of the lower section of the separate inner and outer casings. Fig. 7 is a section of the sound-regulating valve in the sound-discharge passage, on line $z$ $z$ of Fig. 4. Fig. 8 is an elevation of a detachable sound-discharge divided branch. Fig. 9 is a plan, Fig. 10 a side elevation of same in position on the instrument; and Fig. 11 is a section on line $x$ $x$ of Fig. 6.

Referring now to said drawings, 1 indicates the lower hemispherical section of the outer shell or casing; 2 its annular flange at top, and 3 a basal extension, preferably formed with an annular lip 4 in order that the device as a whole may rest upon a stand 5 with an interposed sound-deadening rubber mat 6 or the like. Cast within said lower section 1 of the outer casing is the lower section 7 of the inner casing, which may be semi-globular, or, as shown, be cylindrical, provided it be so formed and united with the lower outer casing section as to form a chamber or space between them which has no practical communication with the interior of inner casing 7. A striker 10 is mounted on a spring-controlled rod 9 within the lower section of the inner casing, in operative relation to the star-shaped pinion 11 on the end of a rod 12 which is sleeved in a tubular bearing 14 extending outwardly through the walls of the two casings, the projecting end of the rod 12 being supplied with an actuating disk 13. Within the lower section of the inner casing and in horizontal alinement with the striking mechanism last described is mounted a sonorous piece of metal which may be in the form of a bell 15 carried on the end of a rod 16 mounted in a movable frame 17, and sound-insulated therefrom as by rubber mat 18. A portion 19 of the wall of lower section 7 is thickened and slotted at 20 which latter serves as a bearing for the free end of bell-supporting rod 16. Also formed integrally or otherwise with casing 7 is a sleeve bearing 21 for a rod 22 carrying a cam end 24 adapted on rotating it wholly, or partly, to move the bell 15 and its supporting rod 16 up or down in the slot 20; such movement being effected by rotatively moving operating rod 22 by means of its disk end 23 which latter may have graduation figures on it spaced to indicate the extent of the vertical adjustment of the bell relatively to the striker 10.

The upper sectional half 25 of the inner casing coincides with the lower half 7 to complete the closed sound chamber 8, and is preferably cast integral with the upper sectional half 26 of the outer casing, the latter being flanged at 27 to coincide with the flange 2 of the lower section 1, the two being detachably united through the flanges by means such as thumb screws 28. The upper section 26 of casing has a vertical extension 29, centrally bored and having an apertured and flanged cap 31, in both of which operates a rotatable cylindrical valve 32 which is appropriately slotted to open and close communication between sound-discharge outlets 33 and 34 or either of them with sound passage chamber 35 at base of extension 29. The base of said chamber 35 is closed save by a perforated wall 30 which forms the top of the inner sound chamber 8.

At right angles to the bored out extension 29 of the casing, and in horizontal alinement with the chamber 33 therein, is cast a sleeve bearing 37 with a supporting bracket 39, in which bearing is mounted a rotatable plug valve 38 extending into chamber 35. The inner end of this plug valve is longitudinally sectioned, as at 36 and bears against the perforated wall 30 to open or close communication between sound chamber 8 of the inner casing and sound chamber 35 of the extension 29. The other end of rotatable plug valve 38 is spirally grooved on its periphery as at 40, to coincide with ribs 42 on the surface of the central opening in an actuating disk 41, which is mounted rotatably in the aforesaid sleeve bearing 37. This disk in addition to its roughened operating portion 43, has a smooth portion 44 on which may be placed a series of numerals adapted to indicate the position of the valve relatively to the part which it controls, and an index finger 49 is mounted to co-act therewith. It can, however, be locked or set by the means shown in Fig. 7; see also Fig. 4. Mounted rotatably in oppositely disposed bearings 47 and 48 to communicate with sound outlet ports 33 and 34 are a pair of tubes 45 and 46, which are so mounted independently rotatably, in said bearings, in order to more conveniently use the apparatus, and angularly disposed nipples 50 and 51 are mounted fixedly on said tubes, to which nipples are removably attached the free ends 52 and 53 of the rubber tubing (see Fig. 1) of the binaural device. In order to enable the operator to test several persons at the same time, comparatively or otherwise, a supplemental nipple, having a plurality of discharge openings, as indicated in Fig. 8 may be detachably interposed between the fixed nipples 50 and 51, or either by slipping its end 54 over such nipples and connecting the rubber tubings 52 and 54 to the tubular sound-discharge ends 55.

In operating the device, the tubular connections being made with one or more binaural devices, for either right or left ear or both, sound-vibrations are created within inclosed chamber 8 formed by the inner casing by continuous rotation of the element 14 actuating the striker and the bell in turn. The latter is adjustable, as to pitch or loudness, by rotating the element 22. The complete or partial discharge of sounds from bell chamber 8 to the sound-outlets is adjustable to a nicety by the valvular device consisting of the rotatable plug 38 and its adjuncts; while the valvular means including the element 32 operate to discharge the sound vibrations through either the right or the left discharge ports 33 and 34 and their tubular connections, or both as may be desired.

The various operative manipulations of the device, in respect to its several elements, will be readily understood from the description already given, and it is obvious that minor changes may be made in the several elements and in the several sub-combinations of them without departing from the principle of the invention, the novel and characteristic features thereof being as hereinafter pointed out in the several claims.

Having thus described my invention, I claim as new and desire to secure by Letters Patent:—

1. In an acoumeter the combination with a casing providing a normally closed sound-chamber having a concaved perforated area in its wall, of a rotatable valvular device coacting with said concaved perforated area to progressively uncover said perforated area, means on said valvular device to rotate it from without the casing, a graduated scale on said valve-actuating means to indicate the extent of its operative rotation, a tubular passageway communicating directly with said sound chamber through said valve-controlled perforated area, and means to create sound-vibrations at will within the casing.

2. In an acoumeter the combination with a casing providing a normally closed sound-chamber having a concaved perforated area in its wall, a rotatable valvular device adapted to progressively uncover said perforated area, means on said valvular device adapted to indicate the extent of its operative position relatively to said perforated area, a tubular passageway communicating with said sound chamber through said valve-controlled perforated area, a plurality of sound-discharge ports in said tubular passageway, valvular means governing all or either of said discharge ports at pleasure; and means to create sound vibrations at will in said casing.

3. In an acoumeter the combination with a casing providing a normally closed sound chamber, a sound-producing means mounted therein, means to actuate the same at will, said means extending through the wall of said casing and adapted to be actuated from without; a tubular passage leading from the apex of said chamber, a valvular device between said elements adapted to progressively open said passageway, a plurality of sound-discharge ports in the wall of said tubular passageway, and a corresponding plurality of sound discharge tubes mounted rotatably in said ports, with valvular means adapted to independently open or close the same.

4. In an acoumeter the combination with a casing providing a substantially closed sound chamber, of a sonorous body mounted therein, means extending through the wall of said chamber and adapted to be actuated from without to intermittently strike said sonorous body and produce sound vibrations within said chamber, means to adjust the operative relation of said sonorous body and striker, means communicating with said sound chamber and constituting a passage-way for the discharge of said sound vibrations therefrom, and a plurality of sound discharge ports in the wall of said passage-way.

5. In an acoumeter the combination with a casing providing the sound chamber, of a sonorous body mounted therein, means extending through the wall of said chamber and adapted to be actuated from without to intermittently strike said sonorous body and produce sound vibrations within said chamber, means to adjust the operative relation of said sonorous body and striker, a scale on said means to denote the extent of said adjustment, means constituting a passage-way for the discharge of sound vibrations from said sound chamber, and a plurality of sound discharge ports in the wall of said passage-way.

6. In an acoumeter the combination of two substantially closed casings mounted one within the other in spaced relation, the inner casing providing a sound-collecting chamber, means to produce sound-vibrations therein at will, a valve-controlled tubular passage leading through both casings and constituting the sole passageway for the discharge of sound-vibrations from the sound-chamber, said tubular passage having a plurality of sound discharge ports, and a tubular shell rotatably mounted in said passage and adapted to govern said sound-discharge ports.

7. In an acoumeter the combination with a casing providing a normally closed sound-chamber, a tubular passage leading from the apex of said chamber, a valvular device between said elements adapted to progressively open said passageway, means to lock said valvular device in any position of adjustment, a plurality of sound-discharge ports in the wall of said tubular passageway, other valvular means governing said ports, sound discharge tubes rotatably mounted in said ports, and a series of nipples on each of said discharge tubes.

8. An acoumeter comprising in combination an exterior casing constructed in separate sections, an interior casing also in separate sections but integral with the exterior casing sections and in spaced relation thereto to form an annular chamber between them, means within the inner casing adapted to emit sound vibrations therein, means forming a sound discharge passage-way leading from the interior of the inner casing and through the outer casing, valvular means governing the area of said passage-way, a plurality of ports in the wall thereof and valvular means governing said ports.

9. In an acoumeter, the combination with a casing providing a sound chamber, an exterior casing providing an inclosing air chamber, a sonorous body in said sound chamber, supporting devices therefor, sound-insulating means between said body and its supporting devices, means extending through the walls of said casings and adapted to be actuated to cause said sonorous body to emit sound vibrations, and means forming a passage leading through the walls of said casing adapted to discharge said sound vibrations to suitable flexible tubular sound conveying devices.

10. An acoumeter comprising in combination an exterior casing composed of a pair of flanged sections, with supporting means therefor, an inner sectional casing integral with the exterior casing sections, but in spaced relation thereto, said inner casing having an interiorly curvilinear wall, devices adapted to create sound vibrations in said inner casing operating as a sound-collecting chamber, a tubular passage leading through the upper sections of both casings, valvular means variably controlling the entrance of sound-vibrations into said passageway, and other valvular means adjustably controlling the discharge of said sound vibrations therefrom.

In testimony whereof, I have hereunto affixed my signature this 16th day of September, A. D. 1910.

CHARLES J. PILLING.

Witnesses:
CHAS. W. MILLER,
A. J. SNYDER.